United States Patent
Foe et al.

(10) Patent No.: US 8,083,586 B2
(45) Date of Patent: Dec. 27, 2011

(54) SYSTEM AND METHOD FOR PROVIDING INTEROPERABILITY OF INDEPENDENTLY-OPERABLE ELECTRONIC GAMES

(75) Inventors: Scott Foe, San Francisco, CA (US); Lisa Waits, Palo Alto, CA (US); Ricky S. Viray, Pacifica, CA (US); Peter Decker, Marl (DE)

(73) Assignee: Nokia Corporation, Espoo (FI)

( * ) Notice: Subject to any disclaimer, the term of this patent is extended or adjusted under 35 U.S.C. 154(b) by 1328 days.

(21) Appl. No.: 11/159,084

(22) Filed: Jun. 22, 2005

(65) Prior Publication Data
US 2007/0021213 A1 Jan. 25, 2007

(51) Int. Cl.
*A63F 13/10* (2006.01)
*A63F 13/12* (2006.01)
(52) U.S. Cl. ............................. 463/29; 463/40; 463/42
(58) Field of Classification Search ............... 463/29, 463/40–43, 2–9, 30, 31
See application file for complete search history.

(56) References Cited

U.S. PATENT DOCUMENTS

| | | | | |
|---|---|---|---|---|
| 4,918,603 A * | 4/1990 | Hughes et al. | ..................... | 463/4 |
| 5,018,736 A * | 5/1991 | Pearson et al. | .................. | 463/29 |
| 5,263,723 A * | 11/1993 | Pearson et al. | .................. | 463/41 |
| 5,636,920 A * | 6/1997 | Shur et al. | ........................ | 700/91 |
| 5,846,132 A * | 12/1998 | Junkin | ............................ | 463/42 |
| 5,860,862 A * | 1/1999 | Junkin | ............................ | 463/40 |
| 6,009,458 A * | 12/1999 | Hawkins et al. | .............. | 709/203 |
| 6,132,315 A * | 10/2000 | Miyamoto et al. | .............. | 463/43 |
| 6,193,610 B1* | 2/2001 | Junkin | ............................ | 463/40 |
| 6,371,855 B1* | 4/2002 | Gavriloff | ........................ | 463/42 |
| 6,579,185 B1* | 6/2003 | Honda et al. | ..................... | 463/43 |
| 6,595,853 B1* | 7/2003 | Osawa | ............................. | 463/20 |
| 6,758,746 B1* | 7/2004 | Hunter et al. | ..................... | 463/9 |
| 7,275,987 B2* | 10/2007 | Shimakawa et al. | .............. | 463/9 |
| 7,675,519 B2* | 3/2010 | Tobias | ........................... | 345/473 |
| 7,713,116 B2* | 5/2010 | Keam et al. | ...................... | 463/1 |
| 2001/0044339 A1* | 11/2001 | Cordero et al. | ................. | 463/42 |

(Continued)

FOREIGN PATENT DOCUMENTS
EP 1 086 732 A1 3/2001
(Continued)

OTHER PUBLICATIONS

Office Action of corresponding Japanese Patent Application No. 2008-517618 dated Feb. 8, 2010, Japan, pp. 1-7.

(Continued)

*Primary Examiner* — David L Lewis
*Assistant Examiner* — Matthew D. Hoel
(74) *Attorney, Agent, or Firm* — Ditthavong Mori & Steiner, P.C.

(57) ABSTRACT

A system for providing interoperability of electronic games independently-operable from one another includes a network entity and a client. The client can interact with the network entity to play a master electronic game using shared attributes otherwise configured for use in a subordinate electronic game, where the client can interpret the respective shared attributes for use during play of the master electronic game. During play of the master electronic game, the client can receive a selection of at least one subordinate game from within the master electronic game. In response, the client can initiate the selected subordinate game for play using shared attributes otherwise configured for use in the master electronic game and/or another subordinate electronic game. Similarly, the client can interpret the respective shared attributes for use during play of the selected subordinate game.

21 Claims, 6 Drawing Sheets

U.S. PATENT DOCUMENTS

| | | | |
|---|---|---|---|
| 2002/0049087 A1* | 4/2002 | Ushiro et al. | 463/42 |
| 2002/0082077 A1* | 6/2002 | Johnson et al. | 463/30 |
| 2002/0094869 A1* | 7/2002 | Harkham | 463/42 |
| 2002/0160833 A1* | 10/2002 | Lloyd et al. | 463/29 |
| 2003/0008713 A1* | 1/2003 | Ushiro et al. | 463/42 |
| 2003/0054885 A1* | 3/2003 | Pinto et al. | 463/42 |
| 2003/0055984 A1* | 3/2003 | Shimakawa et al. | 709/227 |
| 2003/0114227 A1* | 6/2003 | Rubin | 463/43 |
| 2004/0014527 A1* | 1/2004 | Orr et al. | 463/43 |
| 2004/0162136 A1* | 8/2004 | Yamato et al. | 463/29 |
| 2004/0162803 A1 | 8/2004 | Rhoads | |
| 2006/0148545 A1* | 7/2006 | Rhyne et al. | 463/42 |
| 2007/0010328 A1* | 1/2007 | Yokota et al. | 463/42 |

FOREIGN PATENT DOCUMENTS

| | | |
|---|---|---|
| JP | 11290552 A | 10/1999 |
| KR | 2001-0105429 | 11/2001 |
| KR | 2003-0077084 | 10/2003 |
| KR | 10-2004-0092318 | 11/2004 |

OTHER PUBLICATIONS

Office Action of corresponding Korean Patent Application No. 10-2008-7001683 dated Mar. 20, 2010, Korean, pp. 1-11.

Translation of Korean Office Action for corresponding KR Application No. 10-2008-7001683, Aug. 25, 2009, Korea.

European Search Report for corresponding EP App. No. 06765530.8-1238 dated Apr. 15, 2010, pp. 1-3.

Notice from the European Patent Office dated Oct. 1, 2007 Concerning Business Methods, Official Journal EPO, Nov. 2007, pp. 592-593.

Office Action of corresponding Korean Patent Application No. 10-2008-7001683 dated Sep. 2, 2010, Korean, pp. 1-6.

Office Action of corresponding Japanese Patent Application No. 2008-517618 dated Nov. 22, 2010, Japan, pp. 1-3.

* cited by examiner

SYSTEM AND METHOD FOR PROVIDING INTEROPERABILITY OF INDEPENDENTLY-OPERABLE ELECTRONIC GAMES

FIELD OF THE INVENTION

The present invention generally relates to systems and methods of operating an electronic game and, more particularly, relates to systems and methods of providing interoperability of independently-operable electronic games.

BACKGROUND OF THE INVENTION

Electronic games have become a widespread entertainment feature and are well known in the state of the art as video games or gaming machines. To increase the fun of the game many video games offer the option to play against a computer or against other persons. Some games can be played in a one, two or more player mode, to provide virtual adventures, or to economize expensive gaming equipment. There are actually many different gaming simulations such as sports games, car races, strategy games and even war games available. The attraction of some of these games resides in the fact that the games can be played "online" via networks such as the Internet, enabling remote users to access and play different games against each other, while being in different rooms, homes, towns, countries or even continents.

With the proliferation and expansion of electronic games, a number of personal computer (PC)-based content aggregators have arisen to offer users communities of online games from which users can select and play. Examples of such content aggregators include Electronic Arts Inc., Sega Corporation, Microsoft Corporation and Total Entertainment Network. More recently, closed, console-based content aggregators are arising to offer users communities of online games from which users can select and play. Examples of these content aggregators include the Xbox Live™ service offered by Microsoft Corporation and the N-Gage Arena™ service offered by Nokia Corporation.

As the number and expansiveness of electronic games increase, particularly with respect to online games, a number of content aggregators or other game services have started providing or otherwise enabling services such that users can select and play games in online communities, such as in a massively multiplayer manner. These types of games, which are typically referred to as massively multiplayer online games (MMOG's), permit users to log in to a service and play a select online game with a number of other users logged in at various other locations, oftentimes worldwide. Examples of these types of games include Anarchy Online™ (distributed by Funcom Inc.), Dark Age of Camelot™ (distributed by Mythic Entertainment, Inc.), Ragnarok Online™ (distributed by Gravity Interactive, LLC.), Everquest™ (distributed by Sony Online Entertainment Inc.), Star Wars Galaxies™ (distributed by Sony Online Entertainment Inc.), Asheron's Call™ (distributed by Turbine Entertainment Software Corporation), and the SIMS™ family of games (distributed by Electronic Arts Inc.).

As will be appreciated, a number of online games, including a number of MMOG's, include a number of similar elements, attributes and the like. For example, a number of MMOG's provide users with a unique character representation of the user within the respective games, often referred to as an avatar. These avatars, then, often include similar attributes including, for example, physical characteristics such as size, strength and/or power. Also, for example, a number of online games include similar quantitative and/or qualitative measures of achievement or worth, including points, awards, money and the like. Often, MMOG's reflect such measures of achievement in a level of experience of the user's avatar, which may be characterized by a level of experience at different game activities, a level of power, a level of strength and the like of the avatar, and/or items possessed by the avatar (e.g., clothing, weapons, etc.). Further, for example, a number of online games include similar means for users to communicate or otherwise share their game-playing experience with other users, such as by means of friendship or "buddy" relationships with other users.

Although a number of online games share similar elements, attributes and the like, such games currently remain independent of one another such that a user's play of one online game has no bearing on the same user's play of another online game. For example, a measure of achievement reached by a user's avatar in one game is oftentimes not reflected in avatars of the same user in other games. A number of games such as SIMS™ and Everquest™ provide expansions that expand play of a base game. Such expansions, however, are not independent of the base game. As such, users generally cannot play the expansion of an online game without concurrently playing the base game, operating on conjunction with the expansion.

SUMMARY OF THE INVENTION

In light of the foregoing background, embodiments of the present invention provide an improved system, client, network entity and method for providing interoperability of electronic games independently-operable from one another. In accordance with embodiments of the present invention, electronic games are enabled to share elements, attributes and the like, while also being capable of operation independent of one another. Further, to add to the game playing experiences of users, embodiments of the present invention provide an additional game capable of crossing boundaries of independently-operable games to thereby embody interoperability of such games. A user of multiple electronic games can not only share attributes between electronic games capable of operation independent of one another, but can also play an electronic game capable of utilizing the shared attributes to embody the interoperability of the other, independently-operable games. Thus, a user of the additional, master game can play that game using a collection of shared attributes from other electronic games, where the shared attributes are interpreted for use in what ever game the user is playing at any given instance.

According to one aspect of the present invention, a system is presented that provides interoperability of electronic games independently-operable from one another, where the interoperability is provided by means of shared attributes for use during play of the independently-operable electronic games. The independently-operable electronic games include a master electronic game and at least one subordinate electronic game in that the subordinate electronic games are capable of being initiated for play by means of the master electronic game. The system includes a network entity such as a service center, and a client capable of interacting with the network entity. The network entity is capable of operating the master electronic game and maintaining the state of the master electronic game. In turn, the client is capable of interacting with the network entity to play the master electronic game using shared attributes otherwise configured for use in a subordinate electronic game. For example, the master electronic game can be adapted to provide an avatar associated with a client user. During play of the master electronic game, then, the client can be capable of configuring the avatar, and/or directing the avatar perform at least one function, using shared attributes otherwise configured for use in a subordinate electronic game. Irrespective of the exact nature of the master electronic game, however, the client is capable of interpreting the respective shared attributes for use during play of the master electronic game.

During play of the master electronic game, the client is capable of receiving a selection of at least one subordinate game from within the master electronic game. In response to such a selection, the client is capable of initiating the selected subordinate game for play using shared attributes otherwise configured for use in the master electronic game and/or another subordinate electronic game. At least one shared attribute used during play of the master electronic game is the same as at least one shared attribute used during play of the selected subordinate game. Similarly in this instance, then, the client is capable of interpreting the respective shared attributes for use during play of the selected subordinate game.

To maintain the shared attributes, the network entity can also be capable of providing a user profile associated with the client, where the user profile includes the shared attributes. Before interacting with the network entity to play the master electronic game, then, the client can be capable of loading shared attributes from the user profile for use during play of the master electronic game. At least one shared attribute is capable of changing during play of the master electronic game. In such instances, the master electronic game can be capable of communicating with a network entity to reflect the change in the user profile. As such, the changed attribute can be subsequently used during play of the master electronic game and at least one subordinate game.

The client can be further capable of interacting with the same or a different network entity to play the selected subordinate game. In a manner similar to playing the master electronic game, the selected subordinate game can be played using shared attributes otherwise configured for use in the master electronic game and/or another subordinate electronic game. In such instances, the client can be capable of interpreting the respective shared attributes for use during play of the selected subordinate game. Further, in instances where a user profile includes the shared attributes, the client can be capable of loading the shared attributes from the user profile for use during play of the selected subordinate game before the selected subordinate game is played.

According to other aspects of the present invention, a client, network entity and method are provided for providing interoperability of electronic games independently-operable from one another. Embodiments of the present invention therefore provide an improved system, client, network entity and method for providing interoperability of electronic games independently-operable from one another. As indicated above, and explained more fully below, a network entity such as a service center supporting a number of game servers, and thus electronic games, is capable of providing and maintaining attributes shared across the supported games. Those game servers can therefore access such attributes for use during play of the respective games by a client user. To further enhance the game playing experiences of users, the service center is also capable of operating a master online game that crosses boundaries of the supported, subordinate games to thereby embody interoperability of such games. For example, the online game operated by the service center can provide an avatar that can function as the user's identity within the subordinate games, as well as within the master game. In addition, the avatar can navigate through the master game to play the master game, within which attributes shared across the subordinate games can be added, deleted or otherwise modified. As such, the system, client, network entity and method of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
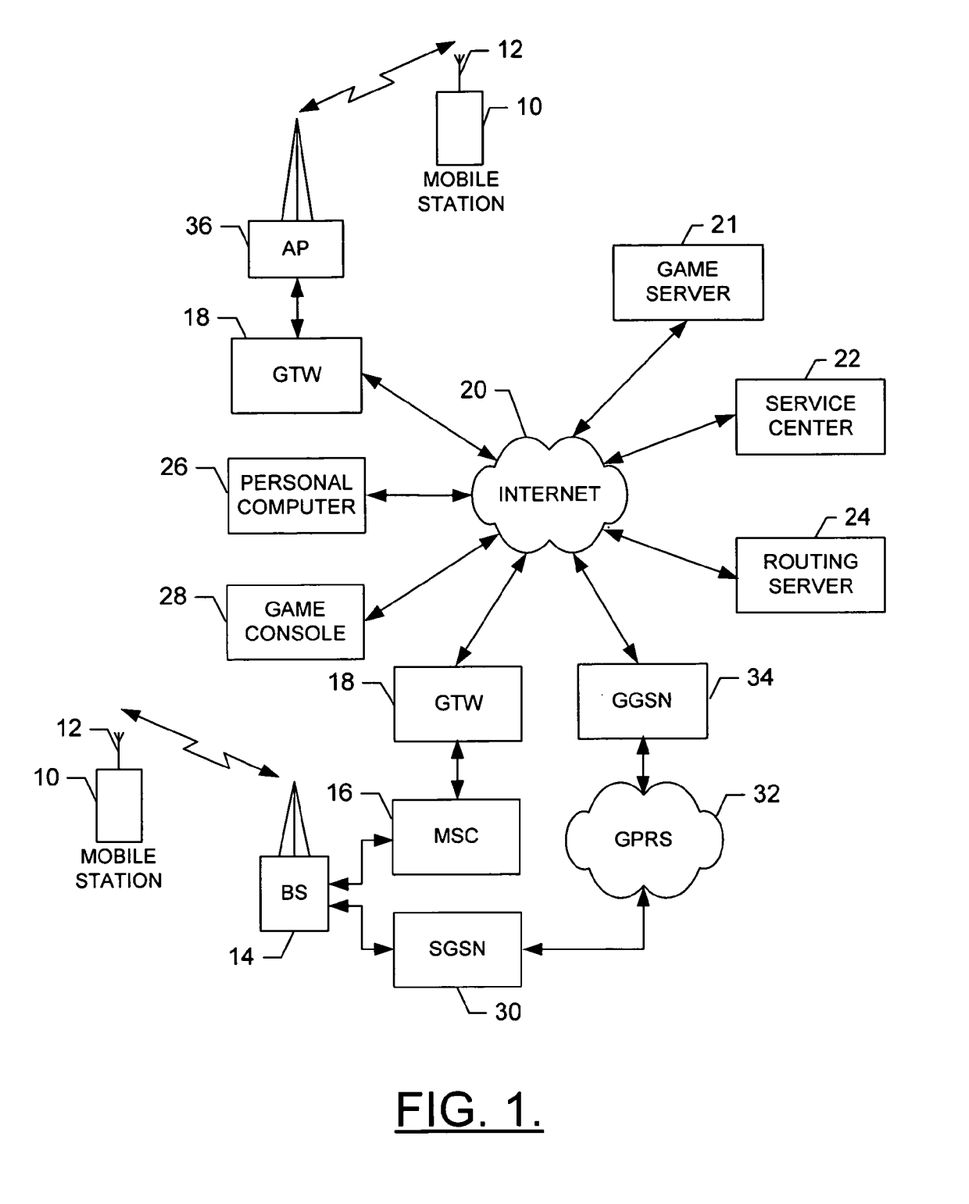
FIG. 1 is a block diagram of one type of terminal and system that would benefit from embodiments of the present invention.

Referring to FIG. 1, an illustration of one type of system that would benefit from the present invention is provided. The system, client, network entity and method of embodiments of the present invention will be primarily described in conjunction with mobile communications applications. It should be understood, however, that the system, client, network entity and method of embodiments of the present invention can be utilized in conjunction with a variety of other applications, both in the mobile communications industries and outside of the mobile communications industries. For example, the system, client, network entity and method of embodiments of the present invention can be utilized in conjunction with wireline and/or wireless network (e.g., Internet) applications.

The system can include one or more mobile stations 10, each having an antenna 12 for transmitting signals to and for receiving signals from one or more base stations (BS's) 14, one of each being shown in FIG. 1. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data and the like to and from mobile stations when those mobile stations are making and receiving calls, data and the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Gateway (GTW) 18, and the GTW is coupled to a WAN, such as the Internet 20. In turn, devices such as processing elements (e.g., personal computers, server computers and the like) can be coupled to the mobile station 10 via the Internet. For example, as explained below, the processing elements can include one or more processing elements associated with one or more game servers 21, service centers 22, routing servers 24, personal computer (PC) systems 26, game consoles 28, and the like, one of each being illustrated in FIG. 1 and described below. As will be appreciated, the processing elements can comprise any of a number of processing devices, systems and the like capable of operating in accordance with embodiments of the present invention.

The BS 14 can also be coupled to a Serving GPRS (General Packet Radio Service) Support Node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols and the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), and the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 1) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 14, the AP's can be directly coupled to the Internet. In one embodiment, however, the APs are indirectly coupled to the Internet via a GTW 18. As will be appreciated, by directly or indirectly connecting the mobile stations and the user processors (e.g., game servers 21, service centers 22, routing servers 24, personal computer (PC) systems 26, game consoles 28) and/or any of a number of other devices to the Internet, whether via the AP's or the mobile network(s), the mobile stations and user processors can communicate with one another to thereby carry out various functions of the respective entities, such as to transmit and/or receive data, content and the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the mobile stations 10 to game servers 21, service centers 22, routing servers 24, personal computer (PC) systems 26 and/or game consoles 28 across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques.

Figure 2:
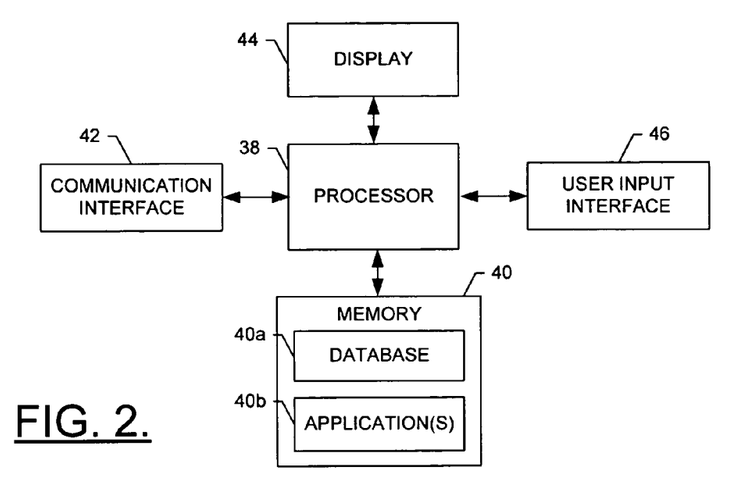
FIG. 2 is a schematic block diagram of an entity capable of operating as a mobile station, game server, proxy server, personal computer (PC) system and/or game console, in accordance with embodiments of the present invention.

Referring now to FIG. 2, a block diagram of an entity capable of operating as a mobile station 10, game server 21, service center 22, routing server 24, personal computer (PC) system 26 and/or game console 28, is shown in accordance with one embodiment of the present invention. Although shown as separate entities, in some embodiments, one or more entities may support one or more of a mobile station, game server, service center, routing server, personal computer (PC) system and/or game console, logically separated but co-located within the entit(ies). For example, a single entity may support a logically separate, but co-located, service center and one or more game servers, and/or one or more routing servers. Also, for example, a single entity may support a logically separate, but co-located personal computer and game console.

As shown, the entity capable of operating as a mobile station 10, game server 21, service center 22, routing server 24, personal computer (PC) system 26 and/or game console 28 generally includes a processor 38 connected to a memory 40. The memory can comprise fixed and/or removable, volatile and/or non-volatile, memory that typically stores content, data and the like. For example, the memory typically stores content transmitted from, and/or received by, the entity. Also for example, the memory typically stores one or more applications 40b, instructions and the like for the processor to perform steps associated with operation of the entity in accordance with embodiments of the present invention.

In addition to the memory 40, the processor 38 can also be connected to at least one interface or other means for displaying, transmitting and/or receiving data, content and the like. In this regard, the interface(s) can include at least one communication interface 42 or other means for transmitting and/or receiving data, content and the like, as well as at least one user interface that can include a display 44 and/or a user input interface 46. The user input interface, in turn, can comprise any of a number of devices allowing the entity to receive data from a user, such as a keypad, a touch display, a joystick or other input device.

Figure 3:
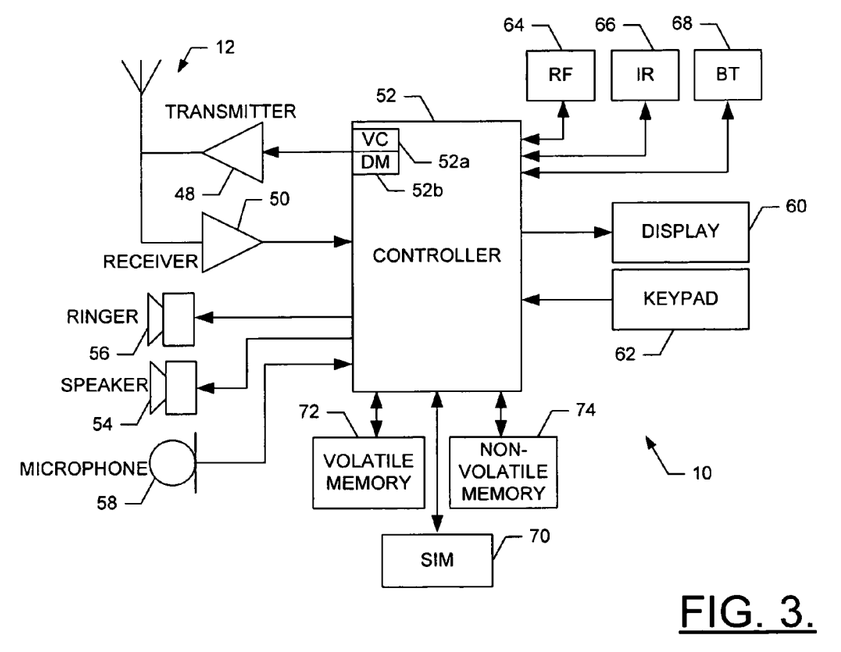
FIG. 3 is a schematic block diagram more particularly illustrating a mobile station in accordance with one embodiment of the present invention.

Reference is now made to FIG. 3, which illustrate one type of mobile station 10, a mobile telephone, which would benefit from embodiments of the present invention. It should be understood, however, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers, mobile gaming devices and other types of electronic systems, can readily employ the present invention.

As shown, in addition to an antenna 14, the mobile station 10 can include a transmitter 48, receiver 50, and controller 52 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols and the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, EDGE, and the like. Further, for example, the mobile station may be capable of operating in accordance with 3G wireless communication protocols such as UMTS network employing WCDMA radio access technology. Some NAMPS, as well as TACS, mobile stations may also benefit from the teaching of this invention, as should dual or higher mode phones (e.g., digital/analog or TDMA/CDMA/analog phones).

It is understood that the controller 52 includes the circuitry required for implementing the audio and logic functions of the mobile station 10. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 52a, and may include an internal data modem (DM) 52b. Further, the controller may include the functionally to operate one or more client software programs such as those indicated above, which may be stored in memory (described below).

The mobile station 10 also comprises a user interface including a conventional earphone or speaker 54, a ringer 56, a microphone 58, a display 60, and a user input interface, all of which are coupled to the controller 52. Although not shown, the mobile station can include a battery for powering the various circuits that are required to operate the mobile station, as well as optionally providing mechanical vibration as a detectable output. The user input interface, which allows the mobile station to receive data, can comprise any of a number of devices allowing the mobile station to receive data, such as a keypad 52, a touch display (not shown), a joystick (not shown) or other input device. In embodiments including a keypad, the keypad includes the conventional numeric (0-9) and related keys (#, *), and other keys used for operating the mobile station.

The mobile station 10 can also include one or more means for sharing and/or obtaining data. For example, the mobile station can include a short-range radio frequency (RF) transceiver or interrogator 64 so that data can be shared with and/or obtained from electronic devices in accordance with RF techniques. The mobile station can additionally, or alternatively, include other short-range transceivers, such as, for example an infrared (IR) transceiver 66, and/or a Bluetooth (BT) transceiver 68 operating using Bluetooth brand wireless technology developed by the Bluetooth Special Interest Group. The mobile station can therefore additionally or alternatively be capable of transmitting data to and/or receiving data from electronic devices in accordance with such techniques. Although not shown, the mobile station can additionally or alternatively be capable of transmitting and/or receiving data from electronic devices according to a number of different wireless networking techniques, including WLAN techniques such as IEEE 802.11 techniques and the like.

The mobile station 10 can further include memory, such as a subscriber identity module (SIM) 70, a removable user identity module (R-UIM) and the like, which typically stores information elements related to a mobile subscriber. In addition to the SIM, the mobile station can include other removable and/or fixed memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory and the like. The memories can store any of a number of software applications, instructions, pieces of information, and data, used by the mobile station to implement the functions of the mobile station.

As will be appreciated, a number of the entities of the system of FIG. 1 can be configured in any of a number of different architectures to perform any of a number of functions, such as to manage a multiplayer game. For example, the entities of the system of FIG. 1 can be configured to manage a multiplayer game in a centralized client-server architecture, decentralized architecture and/or proxy architecture. Additionally or alternatively, for example, the entities of the system of FIG. 1 can be configured in an architecture given in the Scalable Network Application Package (SNAP) (formerly Sega Network Application Package) provided by Nokia Corporation for applications such as in the context of multiplayer gaming.

Figure 4:
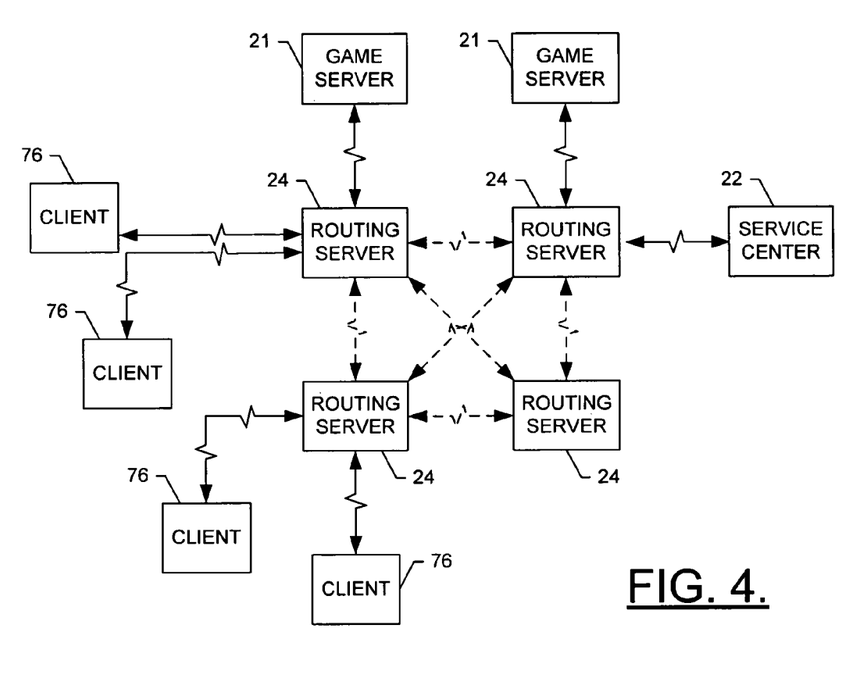
FIG. 4 is a schematic block diagram of an exemplar configuration of various network entities of the system of FIG. 1, in accordance with one embodiment of the present invention.

More particularly, as shown in FIG. 4, for example, one or more mobile stations 10, PC systems 26 and/or game consoles 28 may operate as clients 76 in a gaming architecture that also includes one or more game servers 21, service centers 22 and/or routing servers 24. In the illustrated architecture, the game servers are capable of operating electronic games and maintaining the state of those games. The service centers, in turn, are capable of functionally supporting, or otherwise communicating with, one or more game servers. In addition, in accordance with embodiments of the present invention, the service centers are capable of enabling interoperability of supported game servers, such as by means of an electronic game. As described herein, the games operated by the game servers may, at times, be referred to as "subordinate games" with respect to a "master game" operated by a service center supporting or otherwise communicating with the respective game servers.

As will be appreciated, in lieu of the game servers 21 and/or service centers 22, one or more of the routing servers 24 and/or one or more of the clients 76 themselves may operate portions, or all, of the games and maintain the state of those games. As used herein, then, although games can be operated by one or more network entities, including game servers, service centers, routing servers and/or client(s), the following description may refer to a service center or game server as operating the games for purposes of illustration. Irrespective of the network entit(ies) that operate the games, however, the clients operate game applications that communicate with those network entit(ies) to continuously change the game state of the games operated and maintained by the network entit(ies) to thereby play those games.

Also in the illustrated architecture, the clients 76 are operatively coupled to routing servers 24 which, in turn, are coupled to the game servers 21 and service centers 22. Thus, the routing servers route data packets between one or more clients 76 and the game server, service center, and/or other clients, to facilitate the operation of each entity in the architecture. As shown, the routing servers can be coupled between groups of clients and one or more game servers and/or service centers, directly or indirectly via one or more other routing servers. In this regard, one or more routing servers can also be coupled to other routing servers such that the routing servers can also be coupled between one or more clients and one or more groups of other clients, such as groups of clients coupled to other routing servers.

As explained above in the background section, a number of online games, including a number of massively multiplayer online games (MMOG's), include a number of similar elements, attributes and the like. Currently, however, such games remain independent of one another such that a user's play of one online game has no bearing on the same user's play of another online game. Embodiments of the present invention therefore provide a system and method of permitting games to share elements, attributes and the like, while also being capable of operation independent of one another. Further, to add to the game playing experiences of users, embodiments of the present invention provide an additional game capable of crossing boundaries of independently-operable games to thereby embody interoperability of such games.

More particularly, a service center 22 supporting a number of game servers 21, and thus electronic games, is capable of providing and maintaining attributes shared across the supported games. With a service center providing and maintaining attributes shared across supported game servers, those game servers can access such attributes for use during play of the respective games by a user. Thus, for example, a supported game server can access, and provide an avatar in attributes of an avatar in another supported game. To further enhance the game playing experiences of users, the service center is also capable of operating a master online game that crosses boundaries of the supported, subordinate games to thereby embody interoperability of such games. In this regard, the online game operated by the service center can provide an avatar that can function as the user's identity within the subordinate games, as well as within the master game. In addition, the avatar can navigate through the master game to play the master game, within which attributes shared across the subordinate games can be added, deleted or otherwise modified.

Figure 5:
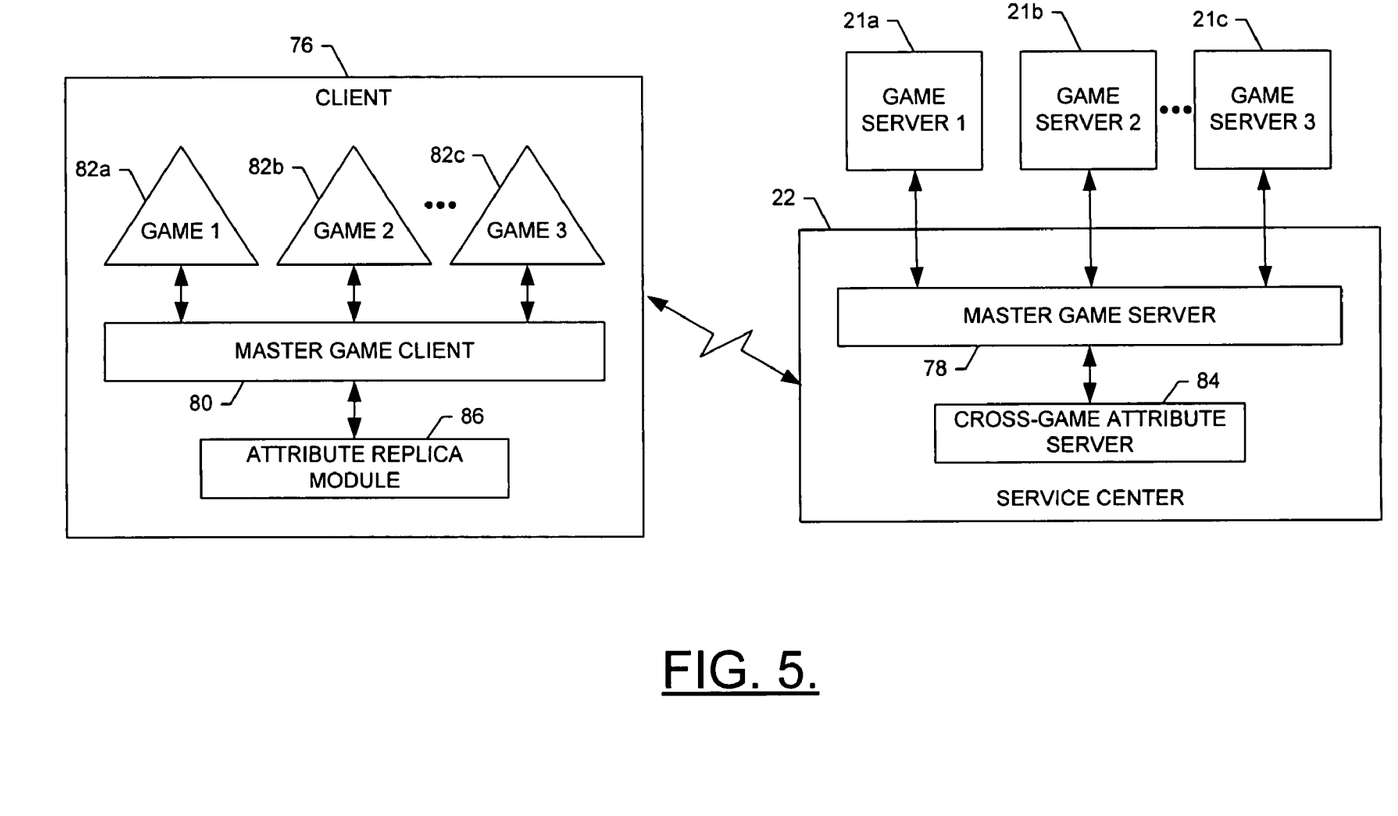
FIG. 5 is a functional block diagram of a client interacting with a service center providing interoperability of independently-operable electronic games, in accordance with one embodiment of the present invention.
Figure 6A:
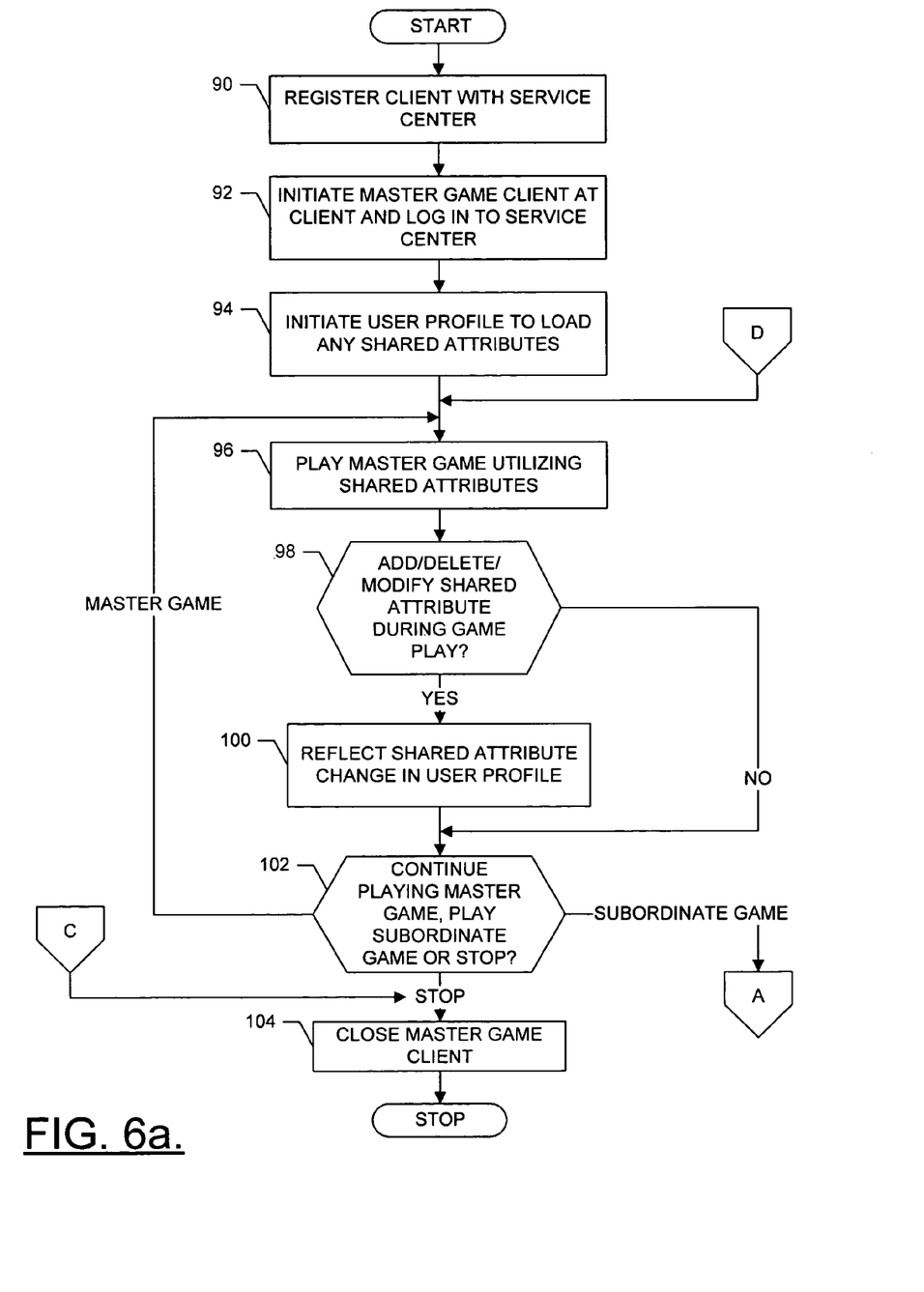
FIGS. 6a and 6b are flowcharts including various steps in a method of providing interoperability of independently-operable electronic games, in accordance with one embodiment of the present invention.
Figure 6B:
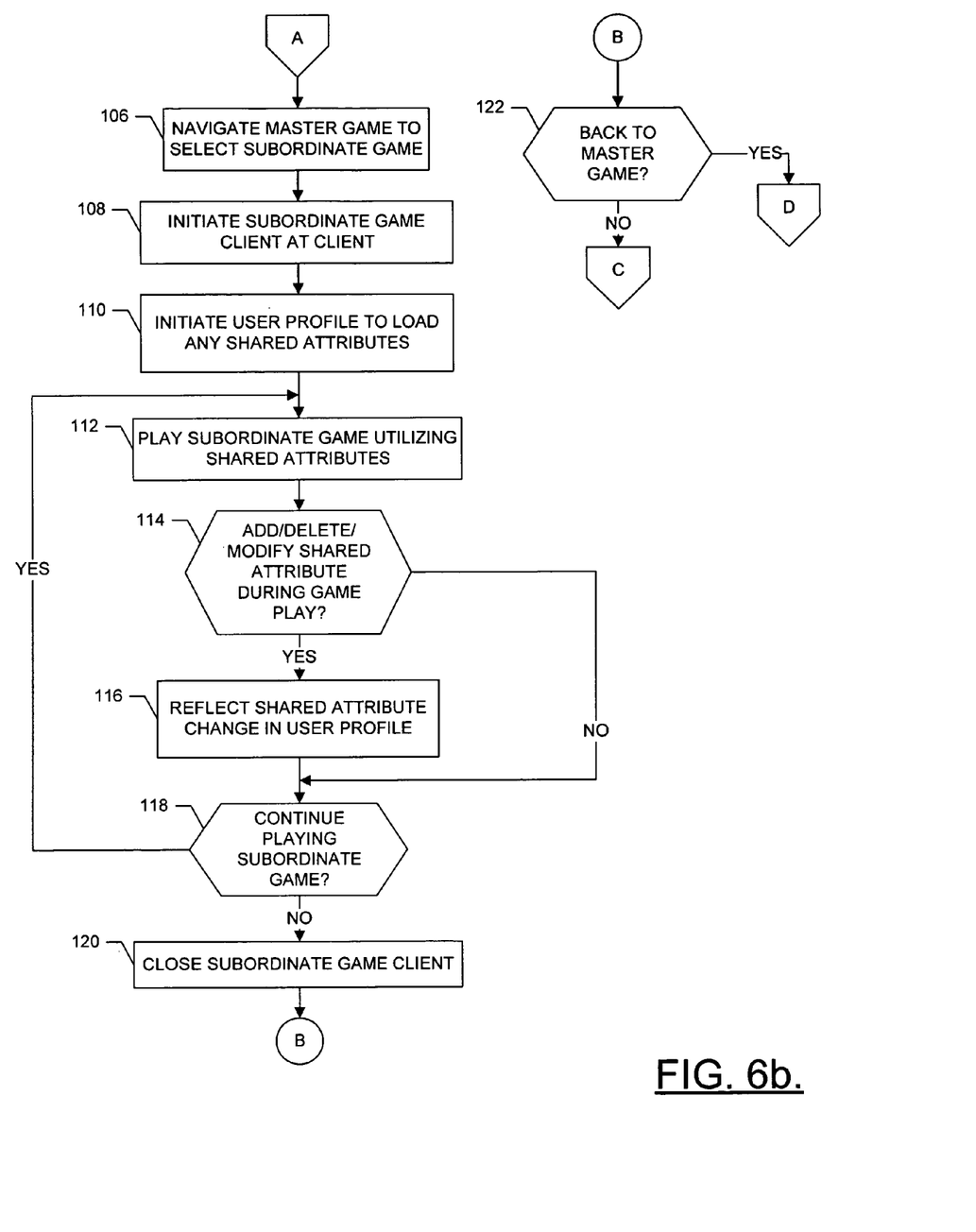

Reference is now drawn to FIGS. 5, and 6a and 6b, which illustrate a functional block diagram and method, respectively, for providing interoperability of independently-operable electronic games. As shown in FIG. 5, a client 76 communicates with a service center 22 to play a master electronic game operated and maintained by a master game server 78 of the service center. In addition, to more fully effectuate play of the master game, the client can communicate with the service center, or more particularly the master game server, to play subordinate, although independently-operable, electronic games operated and maintained by one or more game servers 21 (three game servers being shown as game server 1 21a, game server 2 22b and game server 3 21c).

To locally effectuate play of the master game, the client is capable of operating a master game client 80. Similar to the service center 22, the client can also operate one or more subordinate game clients to 82 to locally effectuate play of the subordinate games via the master game (three game clients being shown as game 1 82a, game 2 82b and game 3 82c for effectuating game play with game servers 1, 2 and 3, respectively). In this regard, the service center and game servers can each include a game application for operating a respective electronic game, and can each maintain the state of the respective game based at least in part on communication with the client, and if so desired, further based at least in part on communication with a number of other clients.

In accordance with embodiments of the present invention, the service server 22 is capable of maintaining a cross-game attribute server 84 which, in turn, is capable of maintaining interpretations of attributes shared between and across the game servers 21, 78 included within or otherwise supported by the service center. Similarly, the client 76 is capable of maintaining an attribute replica module 86 capable of communicating with the cross-game attribute server to interpret one or more of the shared attributes for use by one or more game clients 80, 82 during play of respective games. In this regard, shared attributes maintained by the cross-game attribute server can include, for example, game avatars and/or attributes of avatars such as size, strength and/or power. Also, for example, shared attributes can include quantitative and/or qualitative measures of achievement or worth, including points, awards, money and the like, where one or more measures of achievement can additionally or alternatively be reflected in a level of experience of the user's avatar. This level of experience, then, can be characterized in shared attributes such as a level of experience at different game activities, a level of power, a level of strength and the like of the avatar, and/or items possessed by the avatar (e.g., clothing, weapons, etc.). Further, for example, shared attributes can include associations between users, such as "buddy lists" or other means of establishing and maintaining friendship or "buddy" relationships with other users.

As shown and described herein, the game clients 80, 82 and attribute replica module 86 comprise separate applications operated by the client 76. It should be understood, however, that one or more applications may support one or more of the game clients and/or attribute replica module, logically separated but co-located within the application(s). For example, an application may support both the master game client 80 and the attribute replica module. At the service center 22, one or applications, servers or the like may similarly support both of the master game server 78 and the cross-game attribute server 84, logically separated but co-located within the same application, server or the like. Further, as shown and described herein, the cross-game attribute server is operated by the network entity operating and maintaining the state of the master game server, such as the service center. It should be understood, however, that the cross-game attribute server can alternatively be operated by any of a number of other network entities (e.g., game servers 21, routing servers 24, etc.) in communication with the network entity operating and maintaining the state of the master game server to thereby provide shared attributes to the master game server, and game servers supported by the service center.

Now with reference to FIGS. 6a and 6b, a method of managing for providing interoperability of independently-operable electronic games includes a client 76 or client user registering with the service center 22, such as by means of the master game client 80 operated by the client, as shown in block 90. More particularly, the method includes the client or client user registering with the service center to play the master electronic game operated and maintained by the master game server 78, as well as one or more subordinate electronic games operated and maintained by game servers 21 supported by the service center. As the client registers, the service center may create and store a user profile for the client user, such as in a database of those registered clients or client users. In this regard, the service center can maintain a database of profiles of registered client users, where the profiles include a number of different pieces of information associated with the clients or client users. For example, the service center can request, and thereafter receive for the client users, a username and/or password with which the client user can log in to interact with the master game server to play the master electronic game, and subordinate electronic games of game servers 21 supported by the service center. Also, for example, the service center can request, and thereafter receive, a serial number of other identifier uniquely identifying the particular copy of the master game client stored by the client. Further, the profile for a user can include information regarding the client user's play of the master electronic game and/or subordinate electronic games, such as shared attributes associated with the respective client user.

Although not shown, the client 76 or client user may also separately register with one or more of the game servers 21 supported by the service center 22 to play the respective subordinate electronic games operated and maintained by the respective game servers. Such a registration may be necessary if the client user desires to play the respective subordinate games independent of the master electronic game of the service center. In the instance of playing the respective subordinate games by means of the master electronic game, however, the client or client user may only register with the master game server 78. This registration, then, can effectively register the client or client user with the supported game servers, although the service center may also request, and thereafter receive, serial numbers or other identifies of the subordinate game clients 82 stored by the client to locally effectuate play of the games operated by the respective game servers.

Irrespective of exactly how the client 76 registers with the service center 22, the client user may thereafter initiate the master game client 80 to log in or otherwise authenticate to the service center 22, or more particularly the master game server 78 maintained by the service center, to play the master electronic game operated and maintained by the master game server, as shown in block 92. After being initiated and logging in to the master game server, the game client can interact with the master game server to thereby play the master electronic game. Before interacting with the master game server to play the master electronic game, however, the master game client can initiate the attribute replica module 86 to load, from the client user's profile, any attributes shared across subordinate games operated by game servers 21 for which the client has registered to play, as shown in block 94. More particularly, the master game client can initiate the attribute replica module to interpret shared attributes for use in playing the master electronic game, the interpreted shared attributes otherwise being configured for use in one or more subordinate electronic games of one or more game servers 21. Thereafter, as shown in block 96, the game client can interact with the master game server to thereby play the master electronic game.

To further illustrate aspects of the present invention, consider a master game providing the client user with an avatar within a virtual reality within which the avatar resides. Upon logging in to play the master game, the attribute replica module 86 can be initiated to interpret shared attributes such as, for example, avatar clothing and measures of value otherwise configured for use in a subordinate electronic game. During play of the master game, the avatar can be configured by the client user, and can be directed to perform a number of different functions, including playing subordinate electronic games. For example, the avatar of a client user who is also a soccer fan, or of a client user desiring to play a subordinate soccer game, can be configured to appear wearing a soccer jersey, which may have been obtained during previous play of the soccer game and interpreted for use in the master game. In this example, if the client user desires to change the avatar's clothing, the client user can navigate the avatar through the master electronic game to a location from which the avatar can acquire alternate clothing, such as by cashing in virtual currency, points or the like. The currency, points or other value exchanged by the avatar for alternate clothing can be obtained by the avatar in a number of different manners, including within the master electronic game, and/or within one or more subordinate games during operation of those subordinate games by means of the master game.

Continuing the above example, as suggested, the avatar of a client user playing the master game can obtain value by means of the master electronic game and/or subordinate electronic games. In this regard, those measures of value obtained in the subordinate electronic games are shared attributes in that they can be interpreted for use in the master electronic game. Similarly, the clothing worn by the avatar can be obtained from within the master electronic game, or from one or more of the subordinate games. Further, the avatar of the master electronic game can include a number of other attributes configured for use within respective subordinate electronic games, but interpreted for use in the master game, such as those shared attributes described above.

As the client user plays the master electronic game, one or more shared attributes can be added, deleted or otherwise modified, as shown in block 98. In the above example, for instance, if the client user changes their avatar's clothing by purchasing alternate clothing with virtual currency, points or the like, shared attributes for physical characteristics of the client user's avatar can be modified to reflect the alternate clothing, as can shared attributes for the measure of value exchanged by the avatar for the alternate clothing. Further, for example, during play of the master electronic game, the client user may be presented with one or more challenges which, when completed by the client user's avatar, increase a level of experience of the avatar (level of experience also being a shared attribute).

In those instances in which a shared attribute is added, deleted or otherwise modified, that change in the shared attributes can be reflected in the client user's profile maintained by the service center 22, as shown in block 100. Typically, the client user can continue playing the master electronic game operated by the master game server 78. At one or more instances during play of the master electronic game, then, shared attributes can be added, deleted or otherwise modified, with those changes being reflected in the respective user's profile. If during play of the master game the client user decides to stop play, the client user can terminate interaction with the master game server 78. Interaction with the master game server can be effectuated in any of a number of different manners including, for example, closing the master game client 80 by the client 76, as shown in blocks 102 and 104.

Further, during play of the master electronic game, or at least after logging in to the service center 22, the client user may desire to play a subordinate game operated by a game server 21 supported by the service center, as also shown in block 102. In such an instance, the client user may navigate the master game to select a subordinate game, as shown in block 106 of FIG. 6*b*. The client user can navigate the master game to select a subordinate game in any of a number of different manners. Continuing the above example, for instance, the client user can navigate a lobby or other similar area identifying one or more subordinate games from which the user or user's avatar can select a subordinate game to play.

Irrespective of exactly how a subordinate game is selected from within the master game, the master game client 80 may thereafter initiate the game client 82 of the selected subordinate game. In turn, the game client of the selected subordinate game can initiate communication with a respective game server 21 via the master game server to play the selected subordinate game operated and maintained by the respective game server, as shown in block 108. The subordinate game client can then interact with the game server of the selected subordinate game to thereby play the selected subordinate game. Before interacting with the game server to play the selected subordinate game, however, the respective subordinate game client can initiate the attribute replica module 86 to load, from the client user's profile, any attributes used during play of the respective subordinate game, which are also shared across subordinate games operated by game servers 21 for which the client has registered to play, as shown in block 110. More particularly, similar to before, the subordinate game client can initiate the attribute replica module to interpret shared attributes for use in playing the selected subordinate game, the interpreted shared attributes otherwise being configured for use in the master electronic game and/or one or more other subordinate electronic games of one or more game servers. Thereafter, as shown in block 112, the subordinate game client can interact with the respective game server to thereby play the selected subordinate game.

Again referring to the example above, again consider that the client user has configured their avatar to appear wearing a soccer jersey, which may have been obtained during previous play of a soccer game and interpreted for use in the master game. Now consider that the user desires to again play the soccer game. In such an instance, after selecting to play the soccer game, and initiating the respective game client 82, the client user may control a soccer team to play a soccer match against another soccer team controlled by another client 76 or client user, or controlled by the respective game server 21 itself. In presenting the client user's team, then, the respective game client can interpret the soccer jersey worn by the client user's avatar in the master game for placement on the players of the client user's team during play of the soccer match. Further, the client user can acquire or otherwise obtain, for the user's team, one or more attributes directly or indirectly from attributes otherwise configured for use in the master electronic game or one or more subordinate games. For example, if the client user desires to upgrade the soccer shoes worn by the user's team for quicker movement of the team members, the client user can acquire alternate soccer shoes, such as by cashing in virtual currency, points or the like obtained by the client user or client user's avatar within the master electronic game, and/or within one or more other subordinate games during operation of those respective games.

Similar to with the master electronic game, as the client user plays the subordinate game, one or more shared attributes can be added, deleted or otherwise modified, as shown in block 114. In the above example, for instance, if the client user wins a soccer match against another client user or the respective game server 21, the client user may be awarded virtual currency, points or the like, which may then be used during play of that subordinate game, another subordinate game and/or the master game. Further, for example, by winning the soccer match and/or participating in one or more other challenges presented by the electronic soccer game, a level of experience of the client user may be increased (level of experience also being a shared attribute).

As before, in those instances in which a shared attribute is added, deleted or otherwise modified, that change in the shared attributes can be reflected in the client user's profile maintained by the service center 22, as shown in block 116. The client user can then continue playing the subordinate electronic game operated by the respective game server 21. At one or more instances during play of the subordinate electronic game, then, shared attributes can be added, deleted or otherwise modified, with those changes being reflected in the respective user's profile. Also as before, the client user decides to stop play during operation of the subordinate electronic game, the client user can terminate interaction with the respective game server. Interaction with the respective game server can be effectuated in any of a number of different manners including, for example, closing the subordinate game client 82 by the client 76, as shown in blocks 118 and 120.

Further, upon deciding to stop play of the subordinate electronic game, the client user may desire to return to the master electronic game, such as to play the master electronic game or select, and play, another subordinate game operated by a game server 21 supported by the service center 22, as also shown in block 122. In such an instance, the client user may be returned to the master electronic game upon closing the subordinate game client, or otherwise selecting to return to the master electronic game. If the client user desires to stop play of the subordinate electronic game an not return to the master electronic game, however, the client user can additionally stop interaction with the master game server 78. Similar to before, interaction with the master game server can be effectuated in any of a number of different manners including, for example, closing the master game client 80 by the client 76, as shown in block 104 of FIG. 6*a*.

According to one aspect of the present invention, all or a portion of the system of the present invention, such all or portions of the game server 12, service center 22, routing server 24 and/or client 76 (e.g., mobile station 10, PC system 26, game console 28, etc.), generally operate under control of a computer program product (e.g., game application, game client 80, 82, attribute replica module 86, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 6*a* and 6*b* are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a network entity capable of operating a master electronic game and maintaining the state of the master electronic game; and
a client capable of interacting, via a processor, with the network entity to play the master electronic game using at least one shared attribute otherwise configured for use in at least one subordinate electronic game, the client being capable of interpreting the respective shared attributes for use during play of the master electronic game,
wherein the at least one shared attribute provides interoperability between the master electronic game and the at least one subordinate electronic game,
wherein the master electronic game and the at least one subordinate electronic game are operable independently from one another,
wherein, during play of the master electronic game, the client is capable of receiving a selection of at least one subordinate game from within the master electronic game such that the client initiates the selected subordinate game for play using at least one shared attribute otherwise configured for use in at least one of the master electronic game and another subordinate electronic game, the client being capable of interpreting the respective shared attributes for use during play of the selected subordinate game,
wherein, during play of the master electronic game or the subordinate game, play of the respective electronic game is capable of being stopped or continued, and
wherein at least one shared attribute used during play of the master electronic game is the same as at least one shared attribute used during play of the selected subordinate game.

2. A system according to claim 1, wherein the network entity also provides a user profile associated with the client, the user profile including the shared attributes, and
wherein the client is capable of loading at least one shared attribute from the user profile for use during play of the master electronic game before interacting with the network entity to play the master electronic game.

3. A system according to claim 1, wherein the master electronic game operated by the network entity provides an avatar associated with a client user, and wherein, during play of the master electronic game, the client is capable of at least one of configuring the avatar, and directing the avatar to perform at least one function, using at least one shared attribute otherwise configured for use in a subordinate electronic game.

4. An apparatus comprising:
at least one processor; and
at least one memory including computer program code for one or more programs,
the at least one memory and the computer program code configured to, with the at least one processor, cause the apparatus to perform at least the following,
determine to operate a master game client for interacting with a network entity to play a master electronic game using at least one shared attribute otherwise configured for use in at least one subordinate electronic game
determine to operate a module for interpreting the respective one of the at least one shared attribute for use during play of the master electronic game,
wherein the at least one shared attribute provides interoperability between the master electronic game and the at least one subordinate electronic game,
wherein the master electronic game and the at least one subordinate electronic game are operable independently from one another, and
wherein, during play of the master electronic game, the master game client is capable of receiving a selection of at least one subordinate game from within the master electronic game such that the processor is capable of initiating the selected subordinate game for play using at least one shared attribute otherwise configured for use in at least one of the master electronic game and another subordinate electronic game, the module being capable of interpreting the respective shared attributes for use during play of the selected subordinate game,
wherein, during play of the master electronic game or the subordinate game, play of the respective electronic game is capable of being stopped or continued, and
wherein at least one shared attribute used during play of the master electronic game is the same as at least one shared attribute used during play of the selected subordinate game.

5. An apparatus according to claim 4, wherein a user of the client is associated with a user profile including the shared attributes, and
wherein the module is capable of loading at least one shared attribute from the user profile for use during play of the master electronic game before the master electronic game is played.

6. An apparatus according to claim 5, wherein at least one shared attribute is capable of changing during play of the master electronic game, and wherein the master electronic game is capable of communicating with the network entity to reflect the change in the user profile such that the changed attribute is subsequently used during play of the master electronic game and at least one subordinate game.

7. An apparatus according to claim 4, wherein the apparatus is further caused to determine to operate a subordinate game client for interacting with the network entity to play the selected subordinate game using at least one shared attribute otherwise configured for use in at least one of the master electronic game and another subordinate electronic game, the module being capable of interpreting the respective shared attributes for use during play of the selected subordinate game.

8. An apparatus according to claim 7, wherein a user of the client is associated with a user profile including the shared attributes, and
wherein the module is capable of loading at least one shared attribute from the user profile for use during play of the selected subordinate game before the selected subordinate game is played.

9. An apparatus according to claim 4, wherein the master electronic game provides an avatar associated with a user, and wherein the master game client is configured such that, during play of the master electronic game, a user is capable of at least one of configuring the avatar, and directing the avatar to perform at least one function, using at least one shared attribute otherwise configured for use in a subordinate electronic game.

10. An apparatus comprising:
at least one processor; and
at least one memory including computer program code for one or more programs,
the at least one memory and the computer program code configured to, with the at least one processor, cause the apparatus to perform at least the following,
determine to maintain interpretations of shared attributes configured for use during play of associated electronic games, and interpretable for use during play of other electronic games; and
determine to interact with a client to play a master electronic game using at least one shared attribute otherwise configured for use in at least one subordinate electronic game, the respective shared attributes being interpreted in accordance with interpretations maintained by the cross-game attribute server for use during play of the master electronic game,
wherein the at least one shared attribute provides interoperability between the master electronic game and the at least one subordinate electronic game,
wherein the master electronic game and the at least one subordinate electronic game are operable independently from one another,
wherein, during play of the master electronic game, at least one subordinate game is capable of being selected from within the master electronic game such that the selected subordinate game is initiated for play using at least one shared attribute otherwise configured for use in at least one of the master electronic game and another subordinate electronic game, the respective shared attributes being interpreted in accordance with interpretations maintained by the cross-game attribute server for use during play of the selected subordinate game,
wherein, during play of the master electronic game or the subordinate game, play of the respective electronic game is capable of being stopped or continued, and
wherein at least one shared attribute used during play of the master electronic game is the same as at least one shared attribute used during play of the selected subordinate game.

11. An apparatus according to claim 10 further comprising:
a database capable of storing a user profile including the shared attributes,
wherein at least one shared attribute is capable of being loaded from the user profile for use during play of the master electronic game before playing the master electronic game.

12. An apparatus according to claim 11, wherein at least one shared attribute is capable of changing during play of the master electronic game, and wherein the database is capable of reflecting the change in the user profile such that the changed attribute is subsequently used during play of the master electronic game and at least one subordinate game.

13. An apparatus according to claim 10, wherein the apparatus is further caused to determine to communicate with a subordinate game server associated with the selected subordinate game to effectuate play of the selected subordinate game using at least one shared attribute otherwise configured for use in at least one of the master electronic game and another subordinate electronic game, the respective shared attributes being interpreted in accordance with interpretations maintained by the cross-game attribute server for use during play of the selected subordinate game.

14. An apparatus according to claim 13, wherein the apparatus is further caused to:
determine to store a user profile including the shared attributes, wherein at least one shared attribute is capable of being loaded from the user profile for use during play of the selected subordinate game before playing the selected subordinate game.

15. An apparatus according to claim 10, wherein the master electronic game provides an avatar associated with a user, and wherein the master game server is capable of communicating with the client during play of the master electronic game such that a client user is capable of at least one of configuring the avatar, and directing the avatar to perform at least one function, using at least one shared attribute otherwise configured for use in a subordinate electronic game.

16. A method comprising:
determining to interact, via a processor, with a network entity to play a master electronic game using at least one shared attribute otherwise configured for use in at least one subordinate electronic game, the respective shared attributes being interpreted for use during play of the master electronic game,
wherein the at least one shared attribute provides interoperability between the master electronic game and the at least one subordinate electronic game,
wherein the master electronic game and the at least one subordinate electronic game are operable independently from one another, and
wherein playing the master electronic game includes selecting at least one subordinate game from within the master electronic game such that the selected subordinate game is initiated for play using at least one shared attribute otherwise configured for use in at least one of the master electronic game and another subordinate electronic game, the respective shared attributes being interpreted for use during play of the selected subordinate game, wherein, during play of the master electronic game or the subordinate game, play of the respective electronic game is capable of being stopped or continued, and wherein at least one shared attribute used during play of the master electronic game is the same as at least one shared attribute used during play of the selected subordinate game.

17. A method according to claim 16 further comprising:

determining to provide a user profile including the shared attributes; and determining to load at least one shared attribute from the user profile for use during play of the master electronic game before playing the master electronic game.

18. A method according to claim 17, wherein playing the master electronic game further includes changing at least one shared attribute, and reflecting the change in the user profile such that the changed attribute is subsequently used during play of the master electronic game and at least one subordinate game.

19. A method according to claim 16 further comprising:

determining to operate a subordinate game client to interact with the network entity to play the selected subordinate game using at least one shared attribute otherwise configured for use in at least one of the master electronic game and another subordinate electronic game, the respective shared attributes being interpreted for use during play of the selected subordinate game.

20. A method according to claim 19 further comprising:

determining to provide a user profile including the shared attributes; and determining to load at least one shared attribute from the user profile for use during play of the selected subordinate game before playing the selected subordinate game.

21. A method according to claim 16, wherein the master electronic game and the at least one subordinate electronic game are separate software applications.

* * * * *